(12) United States Patent
Rapoport

(10) Patent No.: US 8,607,437 B2
(45) Date of Patent: Dec. 17, 2013

(54) METHOD OF GENERATING ELECTRICAL CURRENT WITH FREE MOVING INNER MAGNETIC CORE

(71) Applicant: Uri Rapoport, Moshav Ben Shemen (IL)

(72) Inventor: Uri Rapoport, Moshav Ben Shemen (IL)

( * ) Notice: Subject to any disclaimer, the term of this patent is extended or adjusted under 35 U.S.C. 154(b) by 0 days.

(21) Appl. No.: 13/774,154

(22) Filed: Feb. 22, 2013

(65) Prior Publication Data

US 2013/0163298 A1 Jun. 27, 2013

Related U.S. Application Data

(62) Division of application No. 13/039,679, filed on Mar. 3, 2011, now Pat. No. 8,497,606.

(60) Provisional application No. 61/316,858, filed on Mar. 24, 2010.

(51) Int. Cl.
| | |
|---|---|
| *H02K 35/02* | (2006.01) |
| *H02K 15/00* | (2006.01) |
| *H02K 35/00* | (2006.01) |
| *H02K 29/00* | (2006.01) |

(52) U.S. Cl.
USPC ............... 29/598; 29/596; 310/15; 310/68 R; 310/216.066; 290/42; 290/53; 322/3

(58) Field of Classification Search
USPC .......... 310/15, 20, 12.12, 68 R, 80, 103, 105, 310/107, 108, 181, 216.066, 216.111; 290/42, 53; 29/596, 598
IPC ........................ H02K 35/02,29/00, 35/00, 15/00
See application file for complete search history.

(56) References Cited

U.S. PATENT DOCUMENTS

| | | | | |
|---|---|---|---|---|
| 4,758,756 | A * | 7/1988 | Pouillange | 310/152 |
| 5,693,995 | A * | 12/1997 | Syverson | 310/114 |
| 7,102,258 | B2 * | 9/2006 | Shen | 310/50 |
| 7,105,939 | B2 | 9/2006 | Bednyak | |
| 7,288,860 | B2 * | 10/2007 | Cheung et al. | 310/12.12 |
| 7,479,715 | B2 * | 1/2009 | Terzian | 310/15 |
| 2004/0189132 | A1 * | 9/2004 | Horst | 310/209 |
| 2009/0256532 | A1 * | 10/2009 | Ciglenec et al. | 310/81 |
| 2010/0264756 | A1 * | 10/2010 | Lee et al. | 310/38 |
| 2011/0234022 | A1 * | 9/2011 | Rapoport | 310/15 |

\* cited by examiner

*Primary Examiner* — Burton Mullins
*Assistant Examiner* — Michael Andrews
(74) *Attorney, Agent, or Firm* — The Law Office of Michael E. Kondoudis

(57) ABSTRACT

An energy harvesting device (EHD) and method including a hollow outer envelope (201) having an inner wall (200) with a first predetermined magnetic field distributed on an inner surface of the inner wall, at least one inner core (202), free to move in the hollow envelope (200) characterized by a second predetermined magnetic field distributed on an inner surface of the at least inner core, the inner core being characterized by one or more convex projections of magnetically active material, at least one conducting loop (203) disposed at locations selected from the group consisting of the outer envelope and the at least inner core, so as to be suffused with magnetic flux due to the magnetic field distributions of the at least one inner core and the at least one outer envelope and generating an alternating current due to movement of the inner core within the outer envelope and a rectifying circuit in electrical connection with the at least one conducting loop (203) rectifying the alternating current into a current having a DC component.

14 Claims, 9 Drawing Sheets

METHOD OF GENERATING ELECTRICAL CURRENT WITH FREE MOVING INNER MAGNETIC CORE

FIELD OF THE INVENTION

The present invention generally relates to an electromagnetic device for generating electrical current and methods thereof.

BACKGROUND OF THE INVENTION

Electrical generators are ubiquitous devices finding use in most applications requiring electrical power generation. Generally these are based on circular motion; the number of electrical generators adapted for use with non-circular motion is quite restricted. Applications abound where kinetic energy of motion in non-circular or even random direction goes to waste, and thus a device adapted for harvesting this energy would find use. U.S. Pat. No. 7,105,939 discloses an apparatus designed to harvest kinetic energy of repetitive linear motion e.g. in a tube used e.g. for a flashlight; by shaking the tube the circuit is charged (see FIG. 1).

However it will be understood that the harvesting of the kinetic energy inherent in randomly oriented as opposed to strictly linear motion would constitute a significant expansion of the areas in which possible energy harvesting devices could be efficacious.

SUMMARY OF THE INVENTION

It is thus one object of the present invention to provide an efficient electromagnetic electrical current generator comprising a hollow outer envelope having a side wall (201), an inner core (102), free to move in said outer envelope (201), the inner core being characterized by a predetermined magnetic field distribution over its outer surface; at least one conducting loop (103) located in or on the outer envelope adapted to generate a varying voltage due to the varying flux of the inner core; and, a diode bridge interconnected to said conducting wire (300) adapted to rectify said varying voltage.

It is also in the scope of the present invention wherein the outer envelope and the inner core are spheres or cylinders.

It is also in the scope of the present invention wherein the inner surface of said outer envelope (200), and the outer surface of said inner core (202) are at least partially covered, doped, immersed, impregnated, soaked, coated, painted or otherwise disposed by an effective measure of magnets disk shaped or in a powder form comprising the same.

It is also in the scope of the present invention wherein said inner core has a non-uniform mass, increasing the erratic movement of said inner core.

It is also in the scope of the present invention wherein generator comprises two or more cores.

It is still in the scope of the present invention wherein said inner core is an assembly of a plurality of magnets designing any shape with a single predetermined polarity, especially a pyramid.

It is also in the scope of the present invention to provide a method for providing an electromagnetic device for generating electrical current comprising: giving said outer envelope a measurable acceleration or velocity, so as said inner core is actuating back and forth; hence inducing a variation of the magnetic flux density, and producing electrical current until the accelerating or actuating of the outer envelope stops.

It is also in the scope of the present invention wherein the method comprises providing an assembly of a plurality of magnets designing any suitable shape, with a single predetermined magnetic polarity especially a pyramid.

It is within provision of the invention to provide an energy harvesting device (EHD) comprising:
a. an hollow outer envelope having an inner wall with a predetermined magnetic field distribution upon its inner surface;
b. at least one inner core free to move in said envelope characterized by a predetermined magnetic field distribution over its outer surface, said inner core being characterized by one or more convex projections of magnetically active material;
c. at least one conducting loop disposed at locations selected from the group consisting of said outer envelope and said inner envelope, so as to be suffused with magnetic flux due to said field distribution of said at least one inner core and said at least one outer envelope;
d. a rectifying circuit in electrical connection with said at least one conducting loop adapted to transform the fluctuating voltage developed thereby into a voltage having a DC component.

It is further within provision of the invention to provide the aforementioned EHD further wherein said magnetically active material is selected from the group consisting of: permanent magnet material, magnetically permeable material, and combinations thereof.

It is further within provision of the invention to provide the aforementioned EHD selecting permanent magnet material from the group consisting of neodymium iron boron, samarium cobalt, ceramic and alnico.

It is further within provision of the invention to provide the aforementioned EHD, wherein said magnets are disk shaped.

It is further within provision of the invention to provide the aforementioned EHD wherein said magnets are in a powder form.

It is further within provision of the invention to provide the aforementioned EHD wherein the direction of said magnetic material is radial for both said inner core and said outer envelope and of opposite polarity.

It is further within provision of the invention to provide the aforementioned EHD wherein said rectifying circuit is selected from the group consisting of: full wave rectifier, and half wave rectifier.

It is further within provision of the invention to provide the aforementioned EHD wherein said outer envelope and/or said inner core are individually selected from the group consisting of patterns selected from spheres, lens and lens-like patterns, cylinders, molybi augmented polyhedra, cupolaic expanded rhombohedra, rhombically expanded deltahedra, skew polygon expanded polyhedral, icosidodecahedrons, Catalan solids, uniform polyhedral, isohedral polyhedral, convex polyhedra, isohedral deltahedra, acrohedra, Johnson solids, chiral prismatic polyhedral, platonic solids, and irregular shapes.

It is further within provision of the invention to provide the aforementioned EHD wherein said outer envelope and/or said inner core are a composite pattern, in a manner that a first pattern (e.g., sphere) comprising or overlaid by or coated by or in connection with one or more a second pattern (e.g., a plurality of spheres, either in a pattern or an array, that forms a bee's eye composite pattern; or any other pattern as defined above).

It is further within provision of the invention to provide the aforementioned EHD wherein said outer envelope and/or said inner core are patterns selected from convex lens, converging lens, concave lens or mixture thereof.

It is further within provision of the invention to provide the aforementioned EHD wherein said outer envelope and/or said inner core are composite patterns selected from a first pattern, e.g., convex lens, converging lens, concave lens or mixture thereof, comprising or overlaid by or coated by or in connection with at least one second pattern, selected from lens and lens-like patterns or any other patterns.

It is further within provision of the invention to provide the aforementioned EHD wherein said outer envelope and/or said inner core are composite patterns selected from a first pattern, of any structure or texture, comprising or overlaid by or coated by or in connection with at least one second pattern, selected from convex lens, converging lens, concave lens or mixture thereof.

It is further within provision of the invention to provide the aforementioned EHD further wherein the inner surface of said outer envelope and the outer surface of said inner core are at least partially covered by permanent magnetic material.

It is further within provision of the invention to provide the aforementioned EHD further wherein the inner surface of said outer envelope and the outer surface of said inner core are at least partially covered by magnetically permeable magnetic material.

It is further within provision of the invention to provide the aforementioned EHD wherein said inner core is a piston.

It is further within provision of the invention to provide the aforementioned EHD wherein said inner core has a center of mass located distant from its geometric center, increasing the erratic movement of said inner core.

It is within provision of the invention to provide methods for harvesting of energy consisting of providing a hollow outer shell holding magnetically active materials and a set of electrical coils, and an inner body holding magnetically active materials adapted to move within said outer shell, thereby generating voltage in said coils which is subsequently rectified by rectifying means.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

BRIEF DESCRIPTION OF THE FIGURES

In order to understand the invention and to see how it may be implemented in practice, and by way of non-limiting example only, with reference to the accompanying drawing, in which.

DETAILED DESCRIPTION OF PREFERRED EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an electromagnetic device for generating electrical current and a method thereof.

The term 'conductor wire' refers in the present invention to any electromagnetic wire elongated strand of drawn metal that may be optionally looped to create an electronic inductor or electromagnet.

The term 'diode bridge' refers in the present invention to any arrangement of four diodes connected in a bridge circuit that provides the same polarity of output voltage for any polarity of the input voltage. It is used for conversion of alternating current (AC) input into direct current (DC) output.

The term 'current' refers in the present invention to direct electric current and/or alternating electric current.

The term 'alternating current' refers in the present invention to an electrical current whose magnitude and direction vary with non-uniform rate not-exclusively a sine wave.

The term 'erratic' refers in the present invention to the simultaneous rotational and linear motion of the inner core.

The term 'plurality' applies hereinafter to any integer greater than or equal to one.

The term 'magnetic components' hereinafter refers to permanent magnet material, highly permeable material, electromagnetic components, or combinations thereof.

Faraday's law of induction gives the relation between the rate of change of the magnetic flux through the surface S enclosed by a contour C and the gradient of the electric field along the contour. This law states that a voltage is induced in a closed electrical circuit when the magnetic flux Φ through the circuit changes, by an amount $$V = -\frac{d\Phi}{dt}$$

The current device consists of an inner unit and outer unit containing the inner unit, for instance a sphere contained within an out hollow sphere. Either the outer surface of the inner sphere, or the inner surface of the outer sphere, or both, is covered with sources of magnetic field such as permanent magnets. A set of coils on one or more of the aforementioned surfaces develop fluctuating voltages when there is relative movement between the inner and outer units. This voltage is rectified (for instance) by a diode bridge and utilized for electrical power, thus implementing a novel kinetic-energy harvesting generator.

Figure 1:
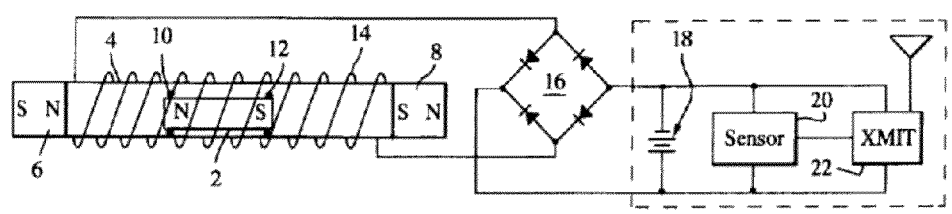
FIG. 1 is an energy harvesting device of the prior art.
Figure 2:
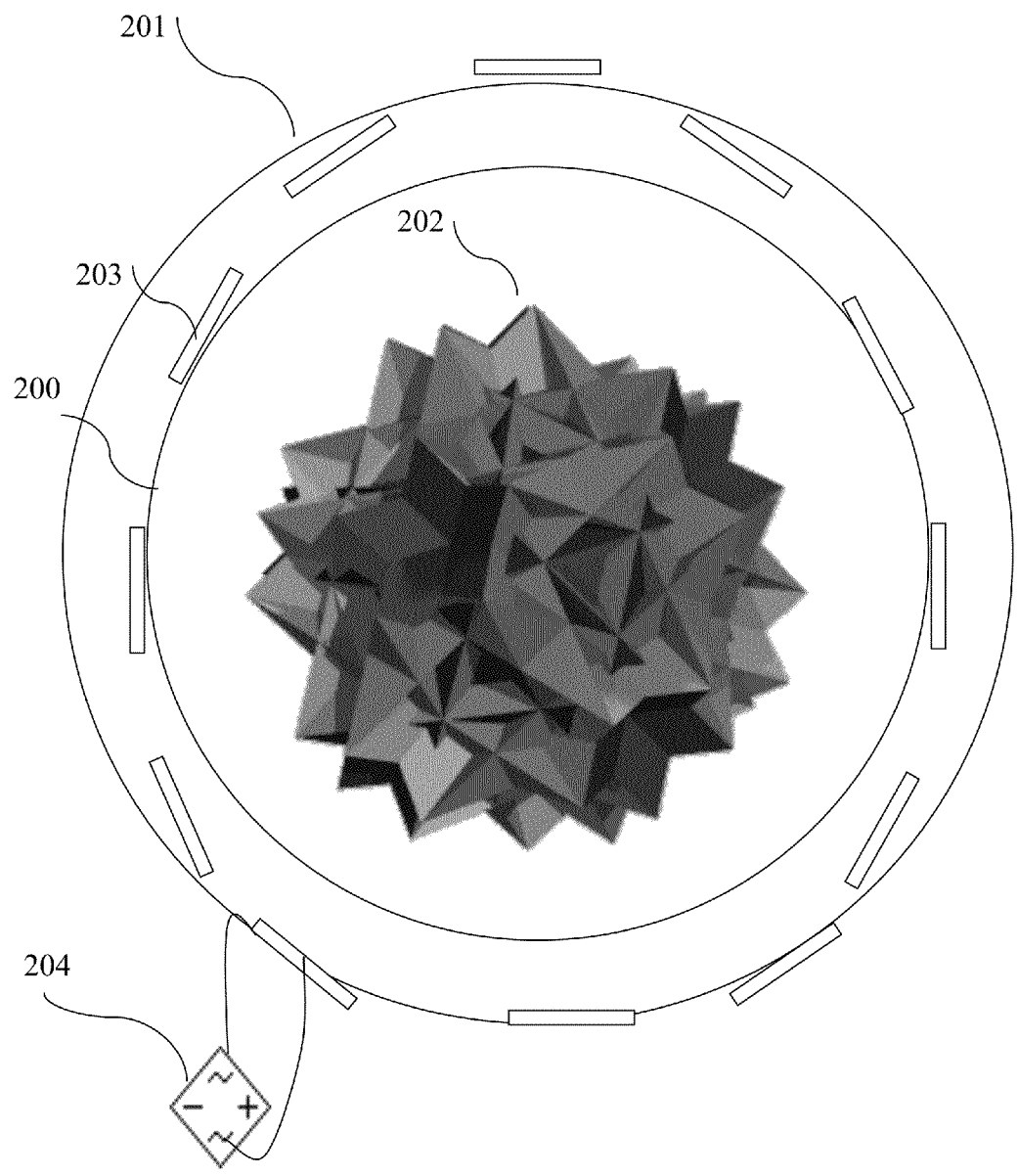
FIG. 2 is a cross section of the inner and outer sections of the device.

FIG. 2 presents a cross section of the inner unit (202) and outer unit (201) which constitute one implementation of the device of the present invention. The outer unit is hollow and has an outer surface (201) and an inner surface 200. On either the inner surface of said outer unit (200) or on the outer surface of said inner unit 202, or both, magnets are disposed. If these magnetic are disposed on both surfaces 200,202 and are of the same polarity (e.g. both 'North'), their fields will interact and the units will tend to repel one another in certain configurations and attract one another in other configurations. The electrical coils 203 are in this example disposed just within the surface 200 and are adapted to be suffused with the varying flux of the inner unit 202 as it spins, gyrates, gambols, and otherwise moves. This movement may be due to shaking of the outer sphere 201, rolling thereof, or the like. The coils 203 will therefore generate an alternating current, which may be rectified e.g. by a full wave rectifier 204, connected in series, and used for electrical power e.g. in a watch, handheld flashlight, USB device, battery charger, or any other device requiring electrical energy.

Figure 3:
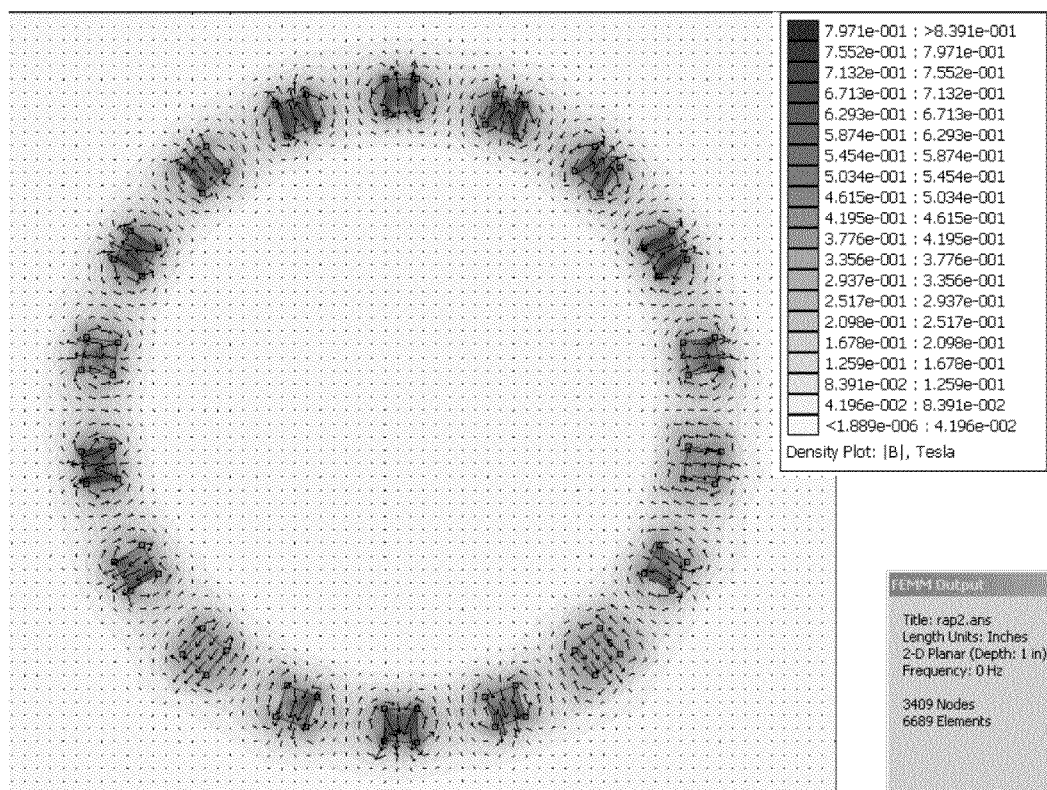
FIG. 3 is a cross section of an embodiment of the inner unit of the device showing its magnetic field distribution.

Reference is made now to FIG. 3, presenting a cross section of the inner ball showing the distribution of the magnetic field due to a series of radially-outward directed permanent magnets of type NFB having remnant field 50 MGOe. As one may appreciate from the figure, a complex distribution results in outward and inward-pointing field vectors at the outer surface of the ball.

Figure 4:
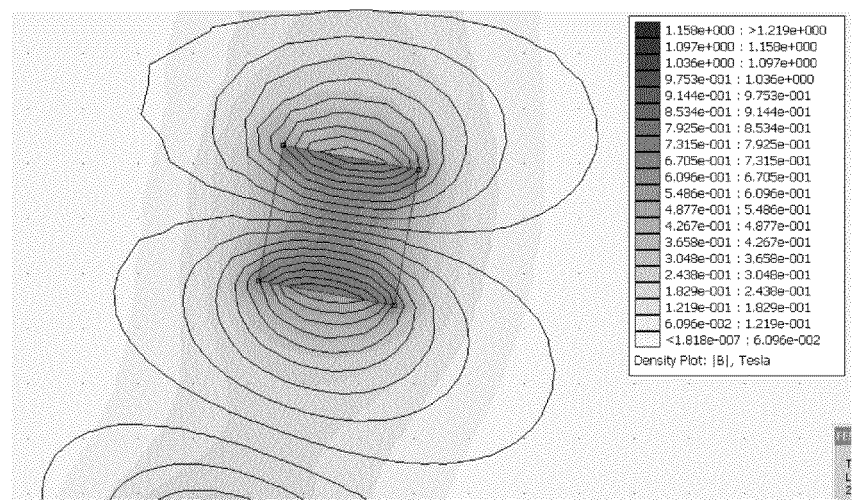
FIG. 4 is a closeup of one magnetic of the inner unit of the device.

Reference is made now to FIG. 4, presenting a closeup of one of the permanent magnets of FIG. 3. As on may see from the figure at a distance of about 0.1 inch from the surface of the magnet, a field of about 0.2 Tesla is obtained (the grid of points in the figure has a 0.1 inch spacing).

Figure 5:
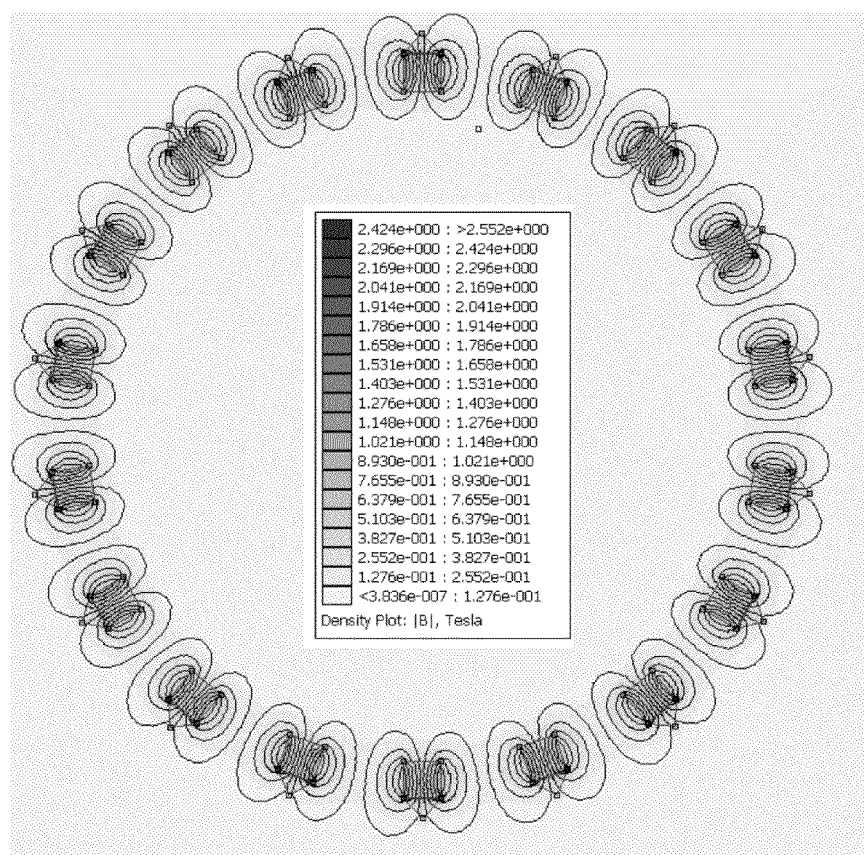
FIG. 5 is a cross section of an embodiment of the inner unit of the device with pyramidal iron caps showing its magnetic field distribution.

Reference is made now to FIG. 5, presenting a cross section of the inner ball showing the distribution of the magnetic field due to a series of radially-outward directed permanent magnets of type NFB having remnant field 50 MGOe and provided with conical caps of soft iron. As one may appreciate from the figure a complex distribution results, but the outward facing field is slightly broadened when compared to the field with no such iron caps.

Figure 6:
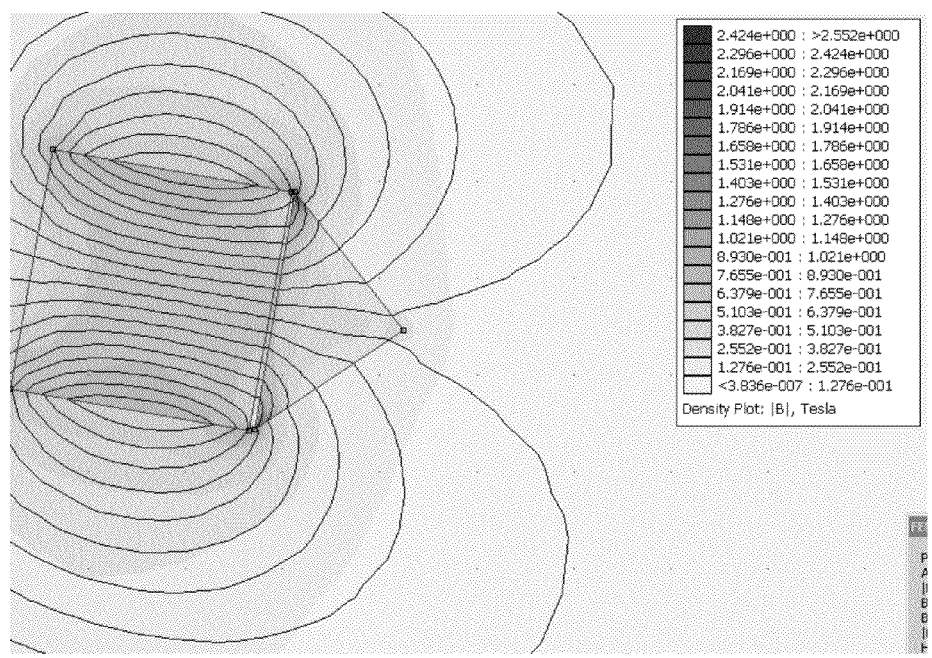
FIG. 6 is a closeup of the device of FIG. 5.

Reference is made now to FIG. 6, presenting a closeup of one of the permanent magnets with iron cap of FIG. 5. As on may see from the figure at a distance of about 0.1 inch from the surface of the magnet, a field of about 0.4 Tesla is obtained as opposed to the 0.2 Tesla obtained without such caps.

Figure 7:
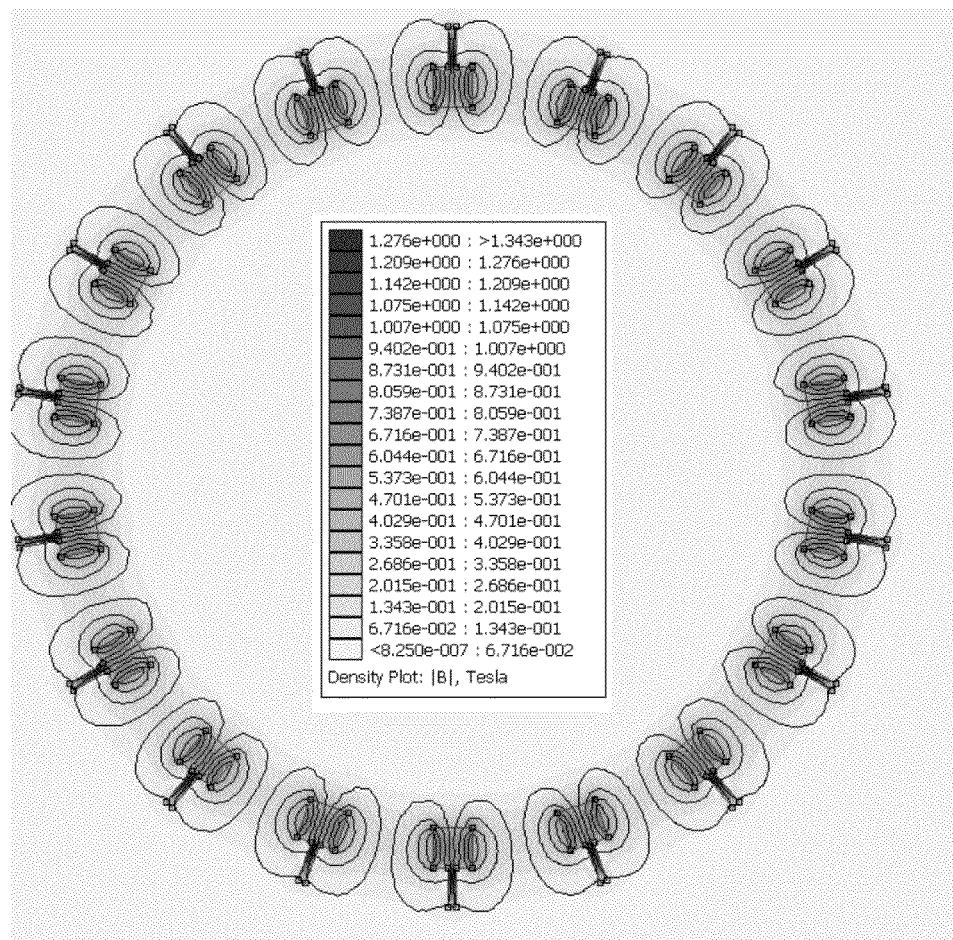
FIG. 7 is a cross section of an embodiment of the inner unit of the device having thin rectangular extensions showing its magnetic field distribution.

Reference is made now to FIG. 7 presenting a cross section of the inner ball showing the distribution of the magnetic field due to a series of radially-outward directed permanent magnets of type NFB having remnant field 50 MGOe and provided with thin rectangular extensions of soft iron. As one may appreciate from the figure a complex distribution results, but the outward facing field is extended outwards when compared to the field with no such extensions.

Figure 8:
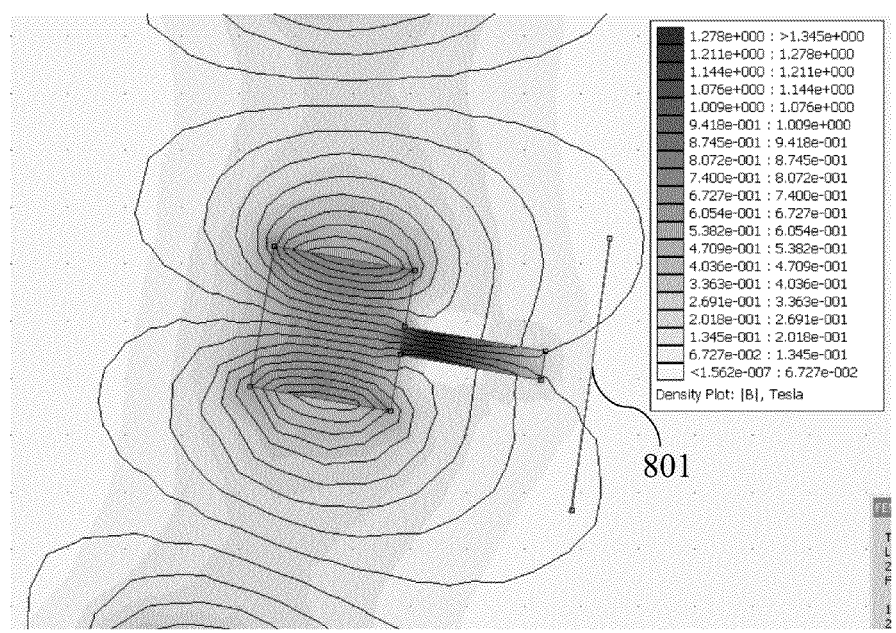
FIG. 8 is a closeup of the device of FIG. 7.

Reference is made now to FIG. 8, presenting a closeup of one of the permanent magnets with iron cap of FIG. 5. As on may see from the figure at a distance of about 0.1 inch from the surface of the magnet, a field of about 0.4 Tesla is obtained as opposed to the 0.2 Tesla obtained without such caps. A normal flux of $9 \times 10^{-6}$ W is found through the surface 801, a value that is greatly amplified over that found without use of the rectangular iron extension.

Figure 9:
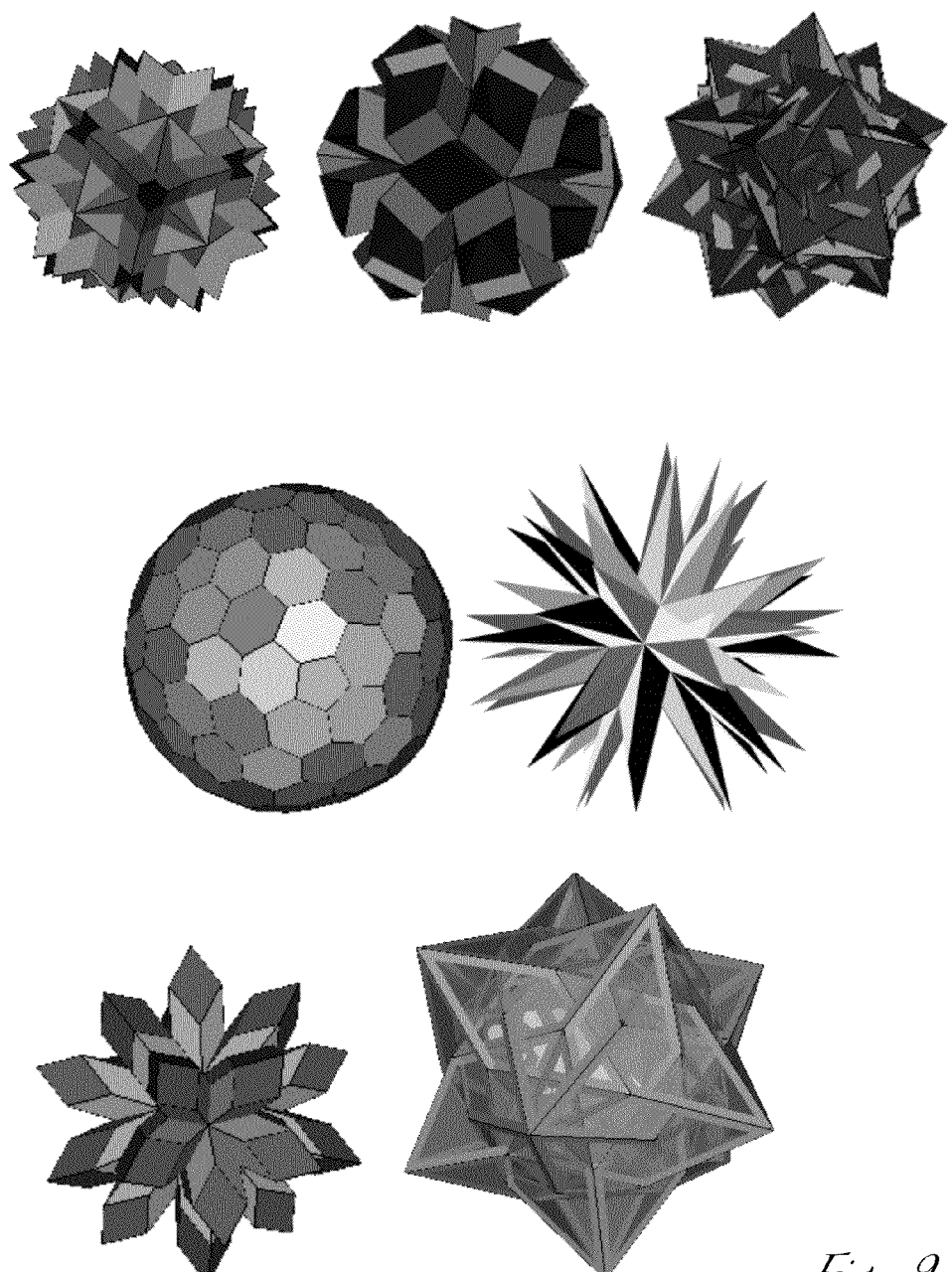
FIG. 9 is a partial perspective view of the pyramid-shaped inner and outer objects.

Reference is made now to FIG. 9 where different embodiments of the inner unit and the outer unit are shown which may take the forms of Molybi Augmented Polyhedra, Cupolaic Expanded Rhombohedra, Rhombically Expanded Deltahedra, Skew polygon expended polyhedral, icosidodecahedrons, and Catalan solids.

As will be obvious to one skilled in the art, the surfaces of these and other solids may be covered with configurations of permanent magnet material and highly magnetically permeable material such that the flux Φ cut by the coils 203 is maximized over an average trajectory of the inner unit 202.

The energy harvesting device so disclosed may be incorporated in a floating body, and be adapted to utilize wave motion of, for example, the sea. The wave movements which are almost always present in varying intensities are used, together with known induction principles, to obtain or generate electric power. Sea wave motion can cause relative movement between the induction elements to generate electricity. The generator can also be incorporated in a buoy which can be attached to boat.

The energy harvesting device herein disclosed can be utilized in several storage processes for military uses, for example. The energy harvesting device may also be incorporated in a watch, and be adapted to utilize for example the human arm motion.

The invention claimed is:

1. A method for generating electrical current comprising steps of:
   a. disposing an inner unit within an outer unit, such that relative motion is possible between said inner unit and said outer unit;
   b. disposing a plurality of magnetically active materials located on an outer surface of said inner unit;
   c. disposing a plurality of coils on an inner surface of said outer unit; and
   d. connecting said plurality of coils to a plurality of rectifiers;
   wherein a voltage having an AC component is generated by said relative motion of said inner unit within said outer unit and said plurality of rectifiers rectifying said alternating current into a current having a DC component, and
   wherein said inner core has a shape selected from a group consisting of molybi augmented polyhedra, cupolaic expanded rhombohedra, rhombically expanded deltahedra, skew polygon expanded polyhedra, icosidodecahedrons, Catalan solids, uniform polyhedra, isohedral polyhedra, convex polyhedra, isohedral deltahedra, acrohedra, Johnson solids, chiral prismatic polyhedra, platonic solids, and lens and lens-like patterns selected from convex lens, converging lens, concave lens and irregular shapes.

2. The method of claim 1, wherein said magnetically active materials are selected from the group consisting of: permanent magnetic material, magnetically permeable material, and combinations thereof.

3. The method of claim 2, wherein said permanent magnetic material is selected from the group consisting of: neodymium iron boron, samarium cobalt, ceramic, alnico.

4. The method of claim 3, wherein a polarization direction of said permanent magnetic material is radial for said inner unit and of opposite magnetic polarity.

5. The method of claim 1, wherein said magnetically active materials are disk shaped.

6. The method of claim 1, wherein said magnetically active materials are in a powder form.

7. The method of claim 1, wherein said plurality of rectifiers is selected from the group consisting of a full wave rectifier and a half wave rectifier.

8. The method of claim 1, wherein the shape of said outer unit is selected from the group consisting of spheres, cylinders, molybi augmented polyhedra, cupolaic expanded rhombohedra, rhombically expanded deltahedra, skew polygon expanded polyhedra, icosidodecahedrons, Catalan solids, uniform polyhedra, isohedral polyhedra, convex polyhedra, isohedral deltahedra, acrohedra, Johnson solids, chiral prismatic polyhedra, platonic solids, and lens and lens-like patterns selected from a group consisting of convex lens, converging lens, concave lens and irregular shapes.

9. The method of claim 1, wherein the inner surface of said outer, unit, and the outer surface of said inner unit are at least partially covered by permanent magnetic material.

10. The method of claim 1, wherein the inner surface of said outer unit, and the outer surface of said inner unit are at least partially covered by magnetically permeable magnetic material.

11. The method of claim 1, wherein said inner unit is a piston.

12. The method of claim 1, wherein said inner unit has a center of mass located distantly from a geometric center of said inner unit thereby increasing erratic movement of said inner unit.

13. The method of claim 1, wherein said magnetically active materials are disk shaped.

14. The method of claim 1, wherein said magnetically active materials are in a powder form.

* * * * *